United States Patent
Cheng et al.

(10) Patent No.: US 10,484,233 B2
(45) Date of Patent: Nov. 19, 2019

(54) IMPLEMENTING PROVIDER EDGE WITH HYBRID PACKET PROCESSING APPLIANCE

(71) Applicant: AT&T Intellectual Property I, L.P., Atlanta, GA (US)

(72) Inventors: Ying Cheng, Holmdel, NJ (US); Bo Yan, Brooklyn, NY (US); Zhiguang Zhang, East Brunswick, NJ (US); Kenneth Duell, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 70 days.

(21) Appl. No.: 15/617,150

(22) Filed: Jun. 8, 2017

(65) Prior Publication Data
US 2018/0359131 A1    Dec. 13, 2018

(51) Int. Cl.
*H04L 12/24* (2006.01)
*H04L 12/46* (2006.01)
*G06F 9/455* (2018.01)
*H04L 12/26* (2006.01)

(52) U.S. Cl.
CPC ...... *H04L 41/0226* (2013.01); *G06F 9/45558* (2013.01); *H04L 12/4633* (2013.01); *H04L 12/4641* (2013.01); *H04L 41/042* (2013.01); *H04L 41/0806* (2013.01); *H04L 41/5061* (2013.01); *H04L 43/022* (2013.01); *H04L 43/026* (2013.01); *H04L 43/16* (2013.01); *H04L 43/08* (2013.01); *H04L 43/0894* (2013.01)

(58) Field of Classification Search
CPC combination set(s) only.
See application file for complete search history.

(56) References Cited

U.S. PATENT DOCUMENTS

| 8,174,967 | B2* | 5/2012 | Sundt ................. H04L 45/00 370/217 |
| 8,233,395 | B2 | 7/2012 | Elias et al. |
| 9,118,564 | B2 | 8/2015 | Han et al. |
| 9,374,312 | B2 | 6/2016 | Denecheau et al. |
| 9,397,933 | B2 | 7/2016 | Carney et al. |
| 10,187,274 | B1* | 1/2019 | R .................... H04L 43/024 |
| 2010/0305449 | A1* | 12/2010 | Wegener ............ A61B 8/483 600/459 |
| 2011/0145657 | A1* | 6/2011 | Bishop ............. G06F 11/3495 714/47.1 |
| 2012/0147753 | A1* | 6/2012 | Jayawardena ...... H04L 41/5022 370/238 |
| 2014/0199074 | A1* | 7/2014 | Cho ................. H04B 10/548 398/79 |
| 2015/0172171 | A1 | 6/2015 | Beller et al. |
| 2016/0014031 | A1 | 1/2016 | Jayawardena et al. |
| 2016/0021015 | A1 | 1/2016 | Thoria et al. |
| 2016/0164782 | A1 | 6/2016 | Wang et al. |

(Continued)

FOREIGN PATENT DOCUMENTS

CN    102088400    6/2011

*Primary Examiner* — El Hadji M Sall
(74) *Attorney, Agent, or Firm* — BakerHostetler

(57) ABSTRACT

A virtual provider edge server may include different modules that implement a hybrid provider edge. A flow detection module may sample received traffic through a server and adaptively detect flows to be offloaded. An offloading module may be an SDN controller that controls the flow tables of a switch that data traffic is offloaded to.

20 Claims, 11 Drawing Sheets

(56) References Cited

U.S. PATENT DOCUMENTS

| | | |
|---|---|---|
| 2016/0218738 A1* | 7/2016 | Kim .................. H03M 7/30 |
| 2016/0248703 A1 | 8/2016 | Gopalakrishnan et al. |
| 2017/0054626 A1 | 2/2017 | Sivabalan et al. |
| 2017/0139607 A1* | 5/2017 | Malkin ............. G06F 3/0607 |
| 2018/0091547 A1* | 3/2018 | St. Pierre ......... H04L 63/1458 |

\* cited by examiner (a) original bucket construction (b) adjusted bucket construction

IMPLEMENTING PROVIDER EDGE WITH HYBRID PACKET PROCESSING APPLIANCE

TECHNICAL FIELD

This disclosure relates generally to management of network resources and, more specifically, with reference to virtual networks.

BACKGROUND

Provider edges (PEs) have been playing a major role in carrier networks to aggregate traffic from customer premises equipment to the core network. To enable fast packet forwarding in the core network with a relatively stable traffic workload, PEs handle a series of complicated tasks including Class of Service (CoS), traffic shaping and policing, IP multicast, and access control.

Traditionally, PEs are proprietary vendor-developed routers deployed at the edge of the carrier network. These proprietary physical devices feature high reliability and a large throughput. However, they introduce high capital expenditure (CAPEX) and operational expenditure (OPEX) for carrier network operators. Hardware boxes are becoming increasingly complicated to provide support for new protocols or standards. Upgrading service products may require a replacement of the entire high-end box and may require complicated physical configuration (e.g. unplug/plug cables, network management access setup, or device configurations).

Recent years of advance in software based traffic processing engines provides opportunities to overcome the cost issues compared to traditional hardware solutions. Specifically, software-based PE implementation can be hosted in Virtual Machines (VM) and can elastically scale based on demand. Meanwhile, software-based PEs can be easily upgraded and may be controlled by centralized management systems. However, the processing performance of software-based PE can typically be bottlenecked by CPU power and can perform poorly under certain traffic patterns.

This disclosure is directed to solving one or more of the problems in the existing technology.

SUMMARY

Disclosed herein is a hybrid PE approach that leverage both hardware and software packet processing appliances and may achieve high packet processing performance with reduced CAPEX and OPEX through intelligent workload division between virtual and hardware appliances. In the hybrid PE approach, packets are processed by default at the software appliances for fine-grain PE features. A modular learning based flow detection module classifies the traffic that can be offloaded to hardware appliance to avoid overloading the software appliances. In addition, in the hybrid PE approach, an offloading module (which may be SDN based) may offload flows with a flow table that provides compact memory usage in the whitebox switches.

In an example, a method may include receiving, by a virtual machine, data from a switch during a period; sampling the data during the period; determining a plurality of characteristics associated with the sampled data; based on a first characteristic of the plurality of characteristics reaching a threshold, determining criteria to indicate data to offload through the switch; and based on the determining the criteria to indicate data to offload through the switch, providing instructions to bypass the virtual machine for subsequent data received at the switch and matching the criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Provider edges (PEs) play a major role in carrier networks to aggregate traffic from customer premises equipment to the core network. To enable fast packet forwarding in the core network with a relatively stable traffic workload, PEs handle a series of complicated tasks including class of service (CoS), traffic shaping and policing, IP multicast, and access control.

Traditionally, PEs are proprietary vendor-developed routers deployed at the edge of the carrier network. These proprietary physical devices feature high reliability and a large throughput. However, they introduce high capital expenditure (CAPEX) and operational expenditure (OPEX) for carrier network operators. Hardware boxes are becoming increasingly complicated to provide support for new protocols or standards. Upgrading service products may require a replacement of the entire high-end box and may require complicated physical configuration (e.g. unplug/plug cables, network management access setup, or device configurations).

A virtualized provider edge (vPE) implementation may be deployed in commodity servers to reduce CAPEX and OPEX and to minimize capital costs. vPEs in commodity servers may be incrementally upgraded to reduce upgrading costs. With vPE's, service maintenance windows may be shortened by migrating or booting up backup vPE instances. However, compared with proprietary physical PE devices, vPEs may face performance issues. For instance, under certain traffic patterns, severe packet loss may happen even for a small throughput.

These commodity whitebox hardware switches (also referred to herein as whitebox switches) may provide packet processing throughput comparable to traditional proprietary switches and open up control plane interfaces for programmable forwarding behaviors. Existing whitebox switches may perform simple packet processing tasks such as layer 2 (L2)/layer 3 (L3) forwarding, access control lists (ACL), or IP-multicast, while more complicated tasks such as rate shaping or fine grain traffic policing are not supported. Commodity whitebox switches generally have significantly limited table capacity (memory) for entries that enable traffic forwarding. Optimized table management is required to avoid overflow and malfunction.

Disclosed herein is a hybrid PE approach that achieves high packet processing performance with a reduced CAPEX and OPEX through an intelligent workload division between a virtual and hardware appliance in the hybrid-PE. In the hybrid PE approach there may be a modular learning based flow detection module that detects flows to be offloaded and adapts to different traffic patterns. In addition, in the hybrid PE approach, an offloading module (which may be SDN based) may offload flows with a flow table that provides compact memory usage (e.g., limited memory as disclosed above) in the whitebox switches.

Figure 1:
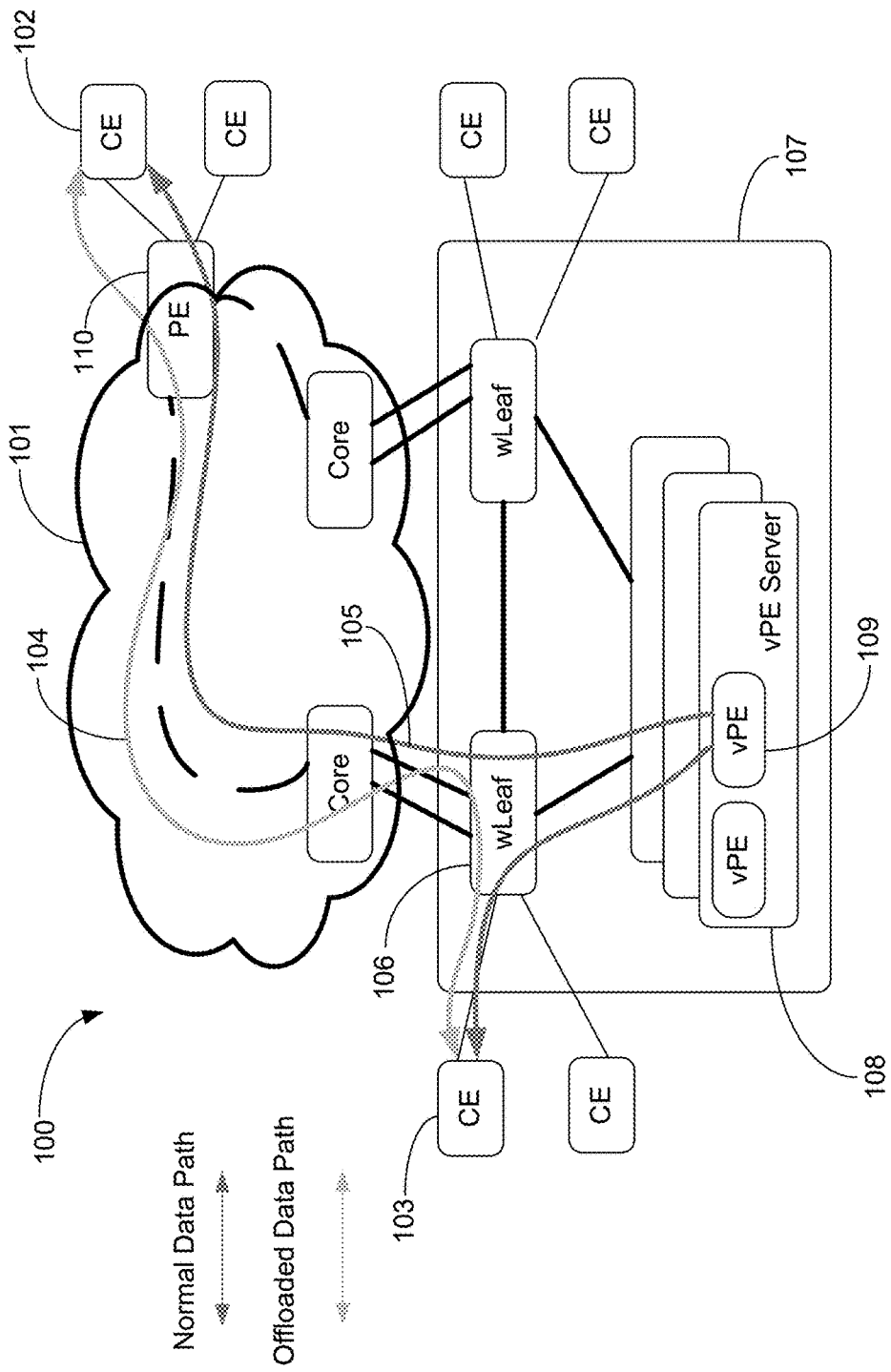
FIG. 1 illustrates an exemplary system that may illustrate a hybrid PE approach.

FIG. 1 illustrates an exemplary system 100 that may implement hybrid provider edge as disclosed herein. System 100 may include a core network 101. There may be provider edges (PEs), such as PE 110 or PE 107, connected with core 101 and customer edge (CE) devices, such as CE device 102 or CE device 103. PE 107, for example, may include whitebox leaf (wLeaf) switches, such as wLeaf switch 106, which are communicatively connected with vPE servers, such as vPE server 108. wLeaf switch 106 may be a programmable switch, such as open flow switches, field programmable gate arrays, or the like. wLeaf switch 106 may be connected with a number of CE devices 103. vPE server 108 may include vPEs, such as vPE 109. vPE 109 may be connected via vLAN tunnels with core network 101 (e.g., a core router) and its peering CE devices 103. Traffic from CE devices 103 may be sent to vPE 109 via wLeaf switch 106. vPE 109 may conduct packet processing operations that include routing, CoS, multicast, or policing, among other things. As disclosed in more detail herein, there may be a normal data path 105 and an offloaded data path 104.

Discussed below is additional information that provides additional implementation details of a hybrid PE approach. Network operators may define different criteria (e.g., characteristics referred herein) for targeting flows to be offloaded with a goal of reducing the workload of vPE server 108 or vPE 109. One use case is to offload short packet flows, which may significantly degrade vPE 109 performance, from vPE 109 to hardware whitebox switches (e.g., wLeaf switch 106).

Figure 2A:
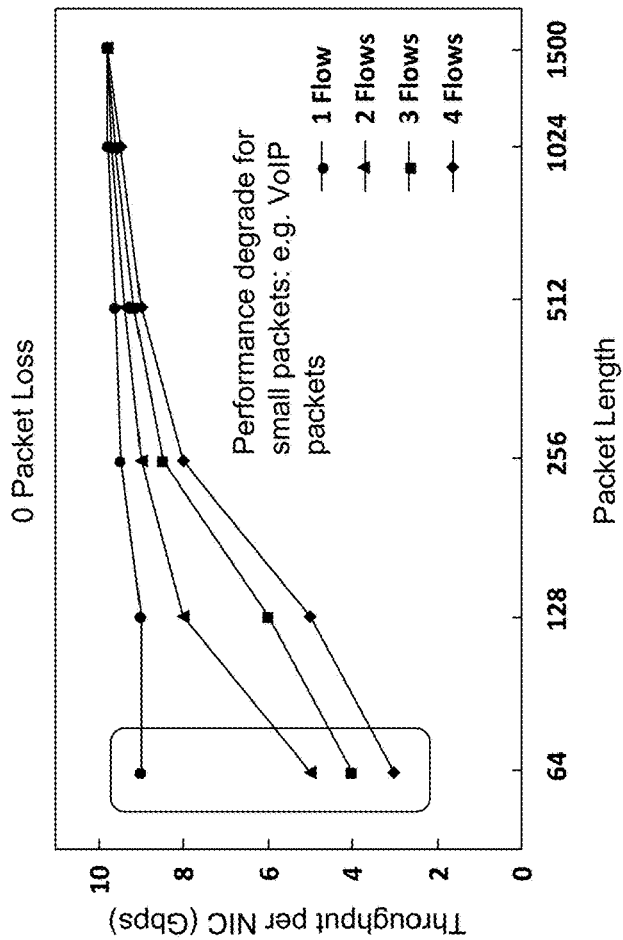
FIG. 2A illustrates a graph with regard to short packet flows with single core (e.g., CPU) throughput with zero packet loss at different packet sizes.
Figure 2A:
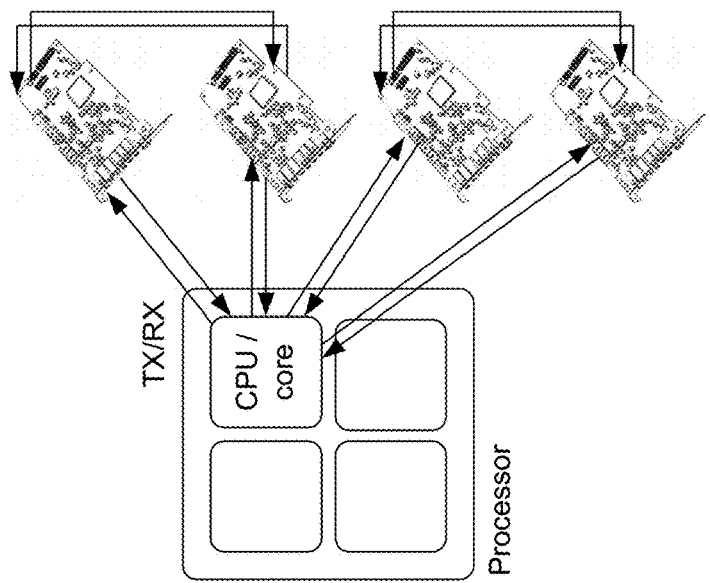
Figure 2B:
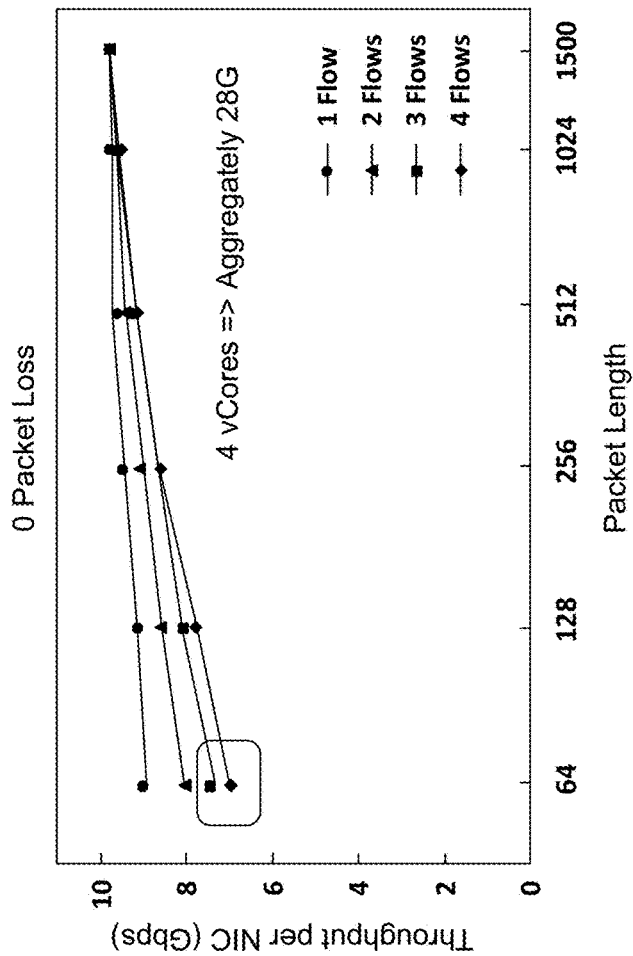
FIG. 2B illustrates a graph with regard to four core throughput with zero packet loss at different packet size.
Figure 2B:
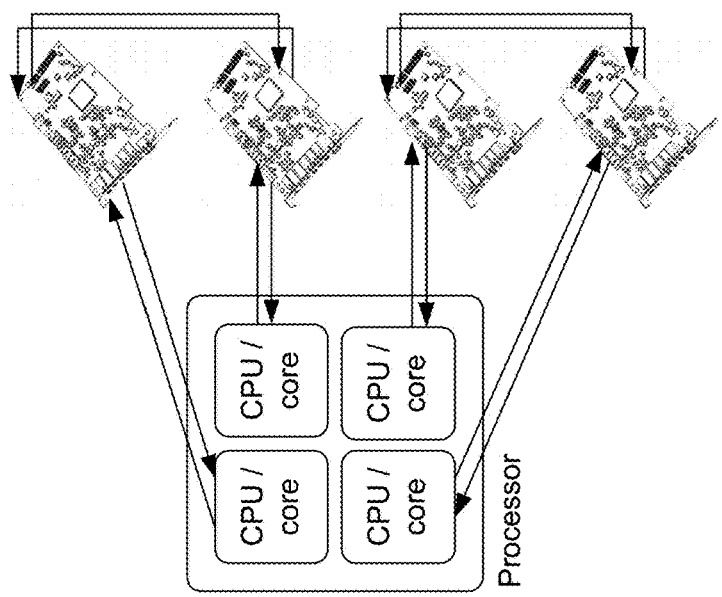

When vPEs 109 are running on whitebox switches, CPU cycles may become the bottleneck for packet processing. For short packets, to reach the line rate (e.g., for a 10 Gigabit (10G) line rate) it requires the vPE to process more packets during a unit period of time. When packets arrive faster than the CPU processing cycles, significant packet loss may happen. An experiment demonstrating such a problem is shown in FIG. 2A and FIG. 2B. FIG. 2A illustrates exemplary short packet flows with single core (e.g., CPU) throughput with zero packet loss at different packet sizes. FIG. 2A shows the layer 1 throughput with one core managing all the flows with zero packet loss. The result shows that for large packet flows the system may be saturated with 10G line rate for each flow, while a significant penalty on the throughput is observed for flows with a short packet length. For a carrier network, typical VoIP packets fall into the range between 64 byte-256 byte. Therefore, large packet loss rate may happen during a significantly large spike of VoIP traffic.

FIG. 2B shows the results of increasing the number of cores to balance workload. Using four cores to handle different flows, the improvement is noticeable. However, the flows do not noticeably saturate the line rate. Shared resources between different CPU cores prohibit linear improvements when the number of cores increases. The hybrid PE approach disclosed herein may provide additional improvements by detecting and offloading short packet flows from a vPE server to a whitebox, so that the effect on the performance of vPE 109 is reduced compared to some conventional systems.

Another use case of traffic offloading may apply to cloud service providers. A major cloud service providers could purchase VPN tunnels to transfer or backup data. This traffic may consume significant bandwidth but may only require relatively simple traffic policing. Therefore, this traffic could be offloaded to the whitebox without over burdening the vPEs 109. While most traffic flows are known to be elephant flows (e.g., an extremely large (in total bytes) continuous flow set up by a TCP (or other protocol) flow measured over a network link) between these tunnel, the flows may start at different times and last for different durations. A hybrid-PE approach may intelligently detect this type of traffic (e.g., elephant flows) and perform traffic offloading on demand.

Whitebox switches generally feature a limited support for PE functionalities. Table 1 lists general PE functionalities and their availability in whitebox switches from popular whitebox vendors. As can be seen from the table, most whitebox switches cover most data plane features in production PEs. However, support on some complicated QoS tasks such as traffic shaping is not available. Support on control plane intelligence such as IP/MPLS routing, traffic measurements, and addressing depends on the firmware running over the box.

TABLE 1

| Example of Whitebox support for PE | |
|---|---|
| Typical PE Features | Support on Whitebox |
| L2/L3 Forwarding | Yes |
| IP/MPLS Routing | Depends on firmware |
| ACL | Yes |
| IP Multicast | Yes |
| CoS Tagging | Yes |
| Traffic Policing | Yes |
| Traffic Shaping | No |
| Traffic Monitoring | Limited |
| Addressing | Depends on firmware |

Given the foregoing, PE intelligence in the hybrid PE approach should be kept in the vPE appliance (e.g., server), and delegate feasible packet processing operations on certain traffic to the whitebox switches.

Figure 3:
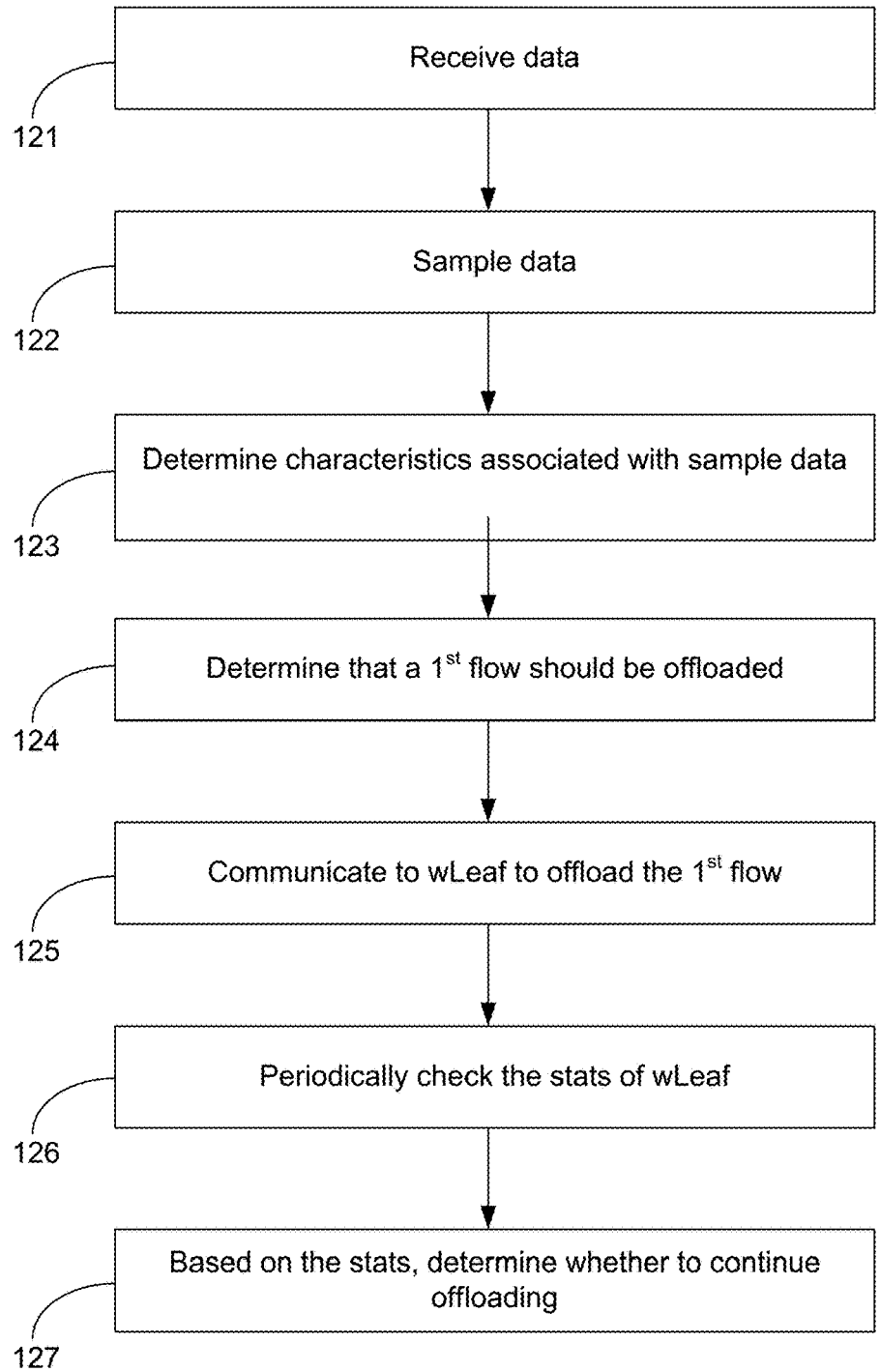
FIG. 3 illustrates an exemplary method for a hybrid PE approach.
Figure 4:
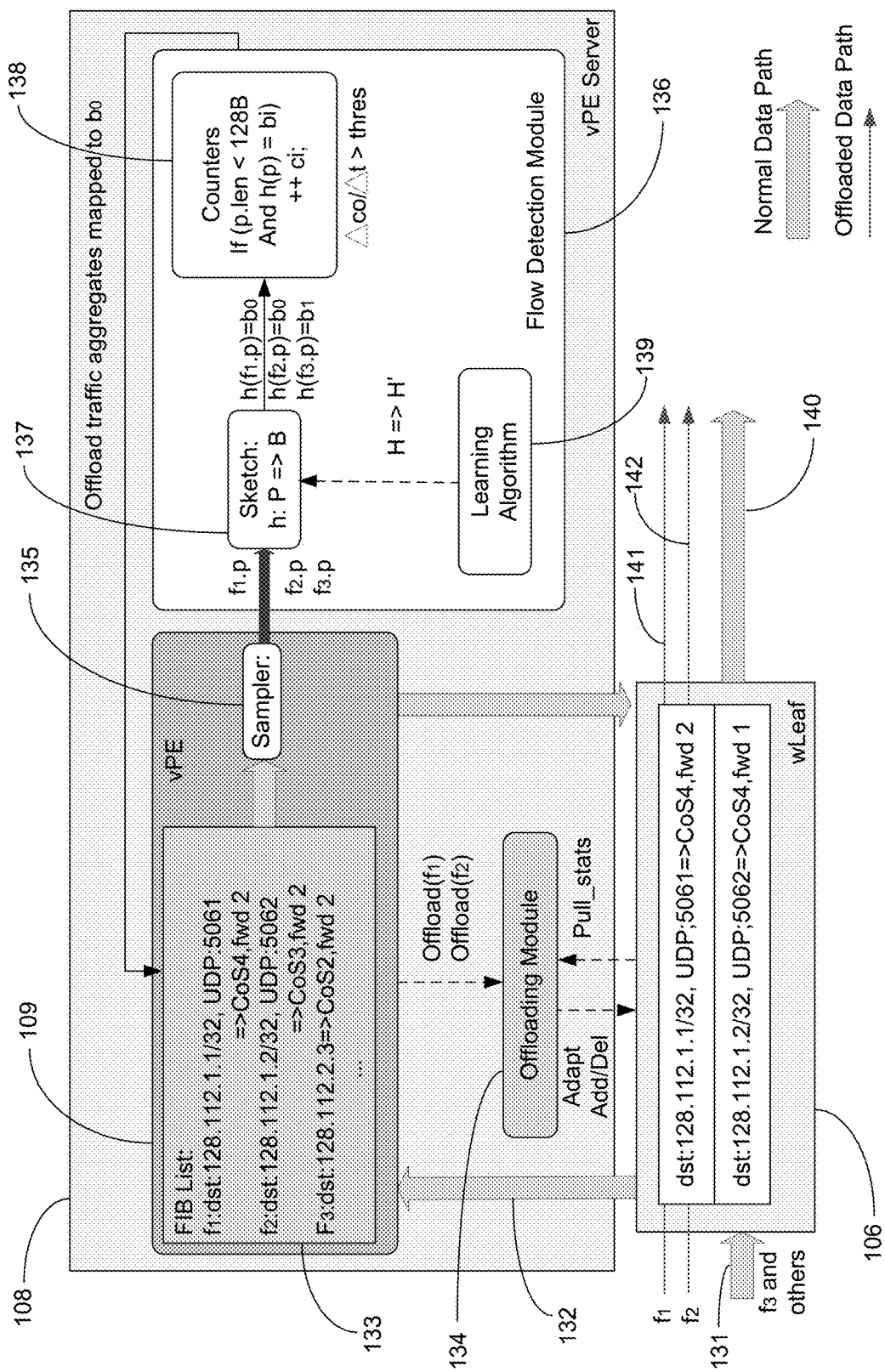
FIG. 4 illustrates an exemplary system for a hybrid PE approach.

FIG. 3 illustrates an exemplary method for a hybrid PE approach in view of FIG. 1 and FIG. 4. FIG. 4 illustrates an exemplary packet flow scenario that may provide additional context for the method of FIG. 3. It may be assumed, in this example, that forwarding information base (FIB) of vPE 109 may include a list of routes associated with different actions. In reality, the packet processing in vPE 109 may be more complicated and have multiple pipelines. Here the list of vPE 109 is presented as is for the sake simplicity. It may also be assumed that initially no flow is offloaded and the flow table of the wLeaf switch 106 (e.g., at time t0) does not include any redirecting entries.

At step 121, vPE 109 may receive data that may have originated from CE device 102 and been passed to vPE 109 via wLeaf switch. This may be at some time t0, in which all traffic traverses normal data path 105 before being offloaded as disclosed herein. When traffic arrives at wLeaf switch 106 of PE 107, there may be three flows carrying the VoIP services with a significant data rate. At step 122, the received data of step 121 may be sampled by sampler 135. Sampler 135 (e.g., a sampling application) in vPE 109 may copy a relatively small subset of traffic (e.g., traffic along normal data path 105 at t0) for analysis. Traffic sampling may help minimize the impact processing data may have on general performance of the communications network and, more specifically, may effectively reduce the workload of the detection module, which in turn may save computation power on vPE server 108.

At step 123, the characteristics (e.g., statistics) associated with the sampled data of step 122 (or other a characteristics of physical or virtual devices) are determined. For example, sampled traffic may be forwarded to a sketch program 137 of flow detection module 136. Sketch program 137 may use a hash function and map the packet fields (e.g., IP src, IP dst, TCP sport and dport, etc) to a number of buckets. For example, sketch program 137 may be defined as follows: h: P→B={$b_i$|$b_0$, $b_1$, . . . , $b_n$}, where P is the aggregate field space of any packet, where B is a set of buckets. The hash function may be proactively defined by manual configuration or controlled by learning algorithm 139 as disclosed in more detail herein. vPE 109 may provide interfaces to plug in various sketch implementations that may be confined by the above definition. Note that although flow detection module 136 is shown outside of the vPE 109 (e.g., the virtual machine), it is contemplated herein that the flow detection module would be within vPE 109

In addition, with reference to step 123, each bucket may be associated with counter 138 that may increment whenever a packet within the bucket is identified as a packet to be offloaded. For instance, there may be a scenario when it is desired to offload flows with packet length shorter than 128 bytes. Whenever an arriving packet p satisfies h(p)=bj and p·len<128B, then the counter cj associated with bucket bj increments by one. An anomaly detection program within vPE 109, for example, may track the counters in this scenario. In this scenario, when the incremental speed of a counter $\Delta cj/\Delta t$ exceeds a threshold, the bucket bj may be determined to be a candidate for offloading and offloading module 134 may send instructions to wLeaf switch 106 to implement offloading for data traffic (e.g., flows) matching the bucket bj.

As shown in FIG. 4, suppose flow detection module 136 maps packets with source or destination addresses falling in 128.112.1.0/24 and UDP ports 5060 and 5061 to bucket b0 using a hash function. Other traffic is mapped to bucket b1. VoIP traffic usually uses port 5060 and 5061 for service. Assume that flow f1 141 and flow f2 142 are the only flows with packets mapped to b0, then the counter c0 associated with b0 will increase quickly since VoIP flows come usually with short packets. Flow detection module 136 may detect that b0 has significant data with short packet (e.g., 40% of sampled packets in b0 are 128 kb). It is contemplated herein that short packets (e.g., approximately 64 kb to 192 kb packets) is just one characteristic that may be a basis of triggering offloading of traffic as disclosed herein. Other exemplary criteria (e.g., characteristics), alone or in combination, that may be detected to trigger offloading may include matching a hash function result, counter (e.g., number of times of type of packet or ID), affect a packet (or flow) has on processor or other performance associated with communication (e.g., packet loss or latency), dependency of packet/flow to another flow, capability of wLeaf switch 106 (e.g., hardware or software specifications), or whether the data packet is part of a significant flow, among other things.

At step 124, based on the characteristics found in step 123, a first flow is determined to be offloaded. Continuing our example associated with FIG. 4, flow detection module 136 may report to vPE 109 or offloading module 134 that the flow with packets mapped to b0 are designated to be offloaded. Upon receiving the reported bucket b0, vPE 109 or offloading module 134 may check its route lists and identify that f1 141 and f2 142 are mapped to b0. Offloading module 134 or vPE 109 may also consider its own statistics or characteristics to determine whether to communicate offloading of a flow. For example, if vPE 109 (or vPE server 108) is processing packets an acceptable threshold level, then it may communicate offloading instructions until the threshold level for processing packets becomes unacceptable.

With continued reference to the method of FIG. 3, at step 125, a communication may be sent to wLeaf switch 106 to adjust the data path of the first flow through wLeaf switch 106 (e.g., matching flows received on interface 131 may be sent through interface 140 rather than being forward through interface 132 which connects with vPE server 108). As can be observed the adjustment in affect bypasses vPE 109 or vPE server 108 for a period. Offloading module 134 may call the (add) function to instantiate the offloading logic. In this scenario associated with FIG. 4, to offload f1 141 on wLeaf switch 106 w1, add(w1, dst=128.112.1.1, [tag CoS4, fwd 2]). f2 142 may be offloaded in a similar manner. Offloading module 134 may give specific characteristics (e.g., IP address ranges, port numbers, class of service, etc.) for the switch to determine whether initiate an offloaded data path or a normal data path.

At step 126 (subsequent to step 125) statistics may be periodically obtained about the first flow through wLeaf switch 106. With the entries being configured, offloading module 134 may pull the counter of the entries with the pull stats(w1) call. At step 127, based on the statistics of step 126, offloading module 134 may determine whether to continue the offloading decision as communicated in step 125. For example, f1 141 may later terminate or the traffic may decrease to a relatively small rate (e.g., offloading module 134 may learn such information from the pulled counters) and call del to delete the entries. In another example, f1 141 may later continue to be significantly utilized based on the statistics or otherwise determined that it should continue to be offloaded from vPE server 108 to wLeaf switch 106. Instructions may be sent to renew a timer that may have deleted the instructions of step 125 to forward through wLeaf switch 106 and circumvent vPE server 108.

Discussed below are additional use cases regarding a hybrid PE. The accuracy of learning targeting flows to be offloaded may depend significantly on the hash function in sketch 137. In a previous example, not all three short packet flows are identified and offloaded. Since flow f3 of FIG. 4 does not fall into b0, it is not identified as a short packet flow, which may a false negative. Some may suggest a hash function which maps source or destination address with a larger range so that all three flows may fall into b0. However, enlarging the detection scope has the risk of mapping other flows into the bucket as well, which may not be necessary and cause false positives. Introduced below are exemplary hash function implementations and associated mechanisms to report data traffic (e.g., traffic aggregates) to be offloaded.

In one example, carrier network operators may have prior knowledge on traffic patterns based on service agreements or network measurements. This prior knowledge may be used to create a blacklist of traffic aggregates which help track targeting flows. In a first use case, a company purchases VPN services from a carrier network operator to serve their VoIP conference calls. It's highly possible that traffic destined or originating from CE sites 103 of the company contributes persistent VoIP traffic flows. A flow aggregate may be put with source or destination IP associated with the interested CE 103 as a blacklist item in sketch 137.

In a second example, a major cloud provider purchases tunnels between different cloud sites for data backup. Flows taking up significant bandwidth may transfer between the end points of the tunnel (e.g., CE 102 and CE 103). These flows are with low priority and do not need complicated QoS enforcement. Therefore, it makes sense to offload them without burdening vPE 109. While it is known that huge flows may be transferred between the end points of the tunnel, when the flows start or how long they will last largely depends on higher-level services. In such case, the endpoint information (e.g., IP address, transport port) may act as a blacklist item (e.g., characteristic) for flow detection.

Sketch 137 may map the hash function of each blacklist traffic aggregate to a unique bucket, while other traffic are not tracked. In an example, whenever the packet rate $\Delta c_i/\Delta t$ associated with a traffic aggregate exceeds a certain predefined bitrate $b_i$, flow detection module 136 may issue an offload call to vPE 109 or offloading module 106 to offload the flows associated with that traffic aggregate.

For many situations there aspects of a traffic pattern that is unexpected. For instance, an unplanned spike of short packet flows may temporarily affect performance of vPE 109 or vPE server 108. To accommodate more dynamic and somewhat non-deterministic cases, a decision tree based learning algorithm may be used to mine the unfriendly flows (e.g., flows that significantly contribute to performance issues). Compared with sketch 137 that may use a deterministic blacklist, the hash function of sketch 137 that may use a decision-tree is dynamically adjusted by a learning program (e.g., learning program 139). Generally, the idea is to partition the packet field space into smaller buckets level by level with a decision tree. To construct more accurate buckets that cover most targeting traffic, learning algorithm 139 may reshape the buckets or resize the buckets. The decision making of merging buckets or splitting buckets may be based on the traffic pattern or "purity" of the bucket, which may be based on a percentage of unfriendly traffic among traffic falling into a bucket (e.g., an exemplary characteristic as disclosed above). Offload requests may be generated based on the total unfriendly traffic of the bucket, similar to the sketch 137 that uses the blacklist.

Figure 5A:
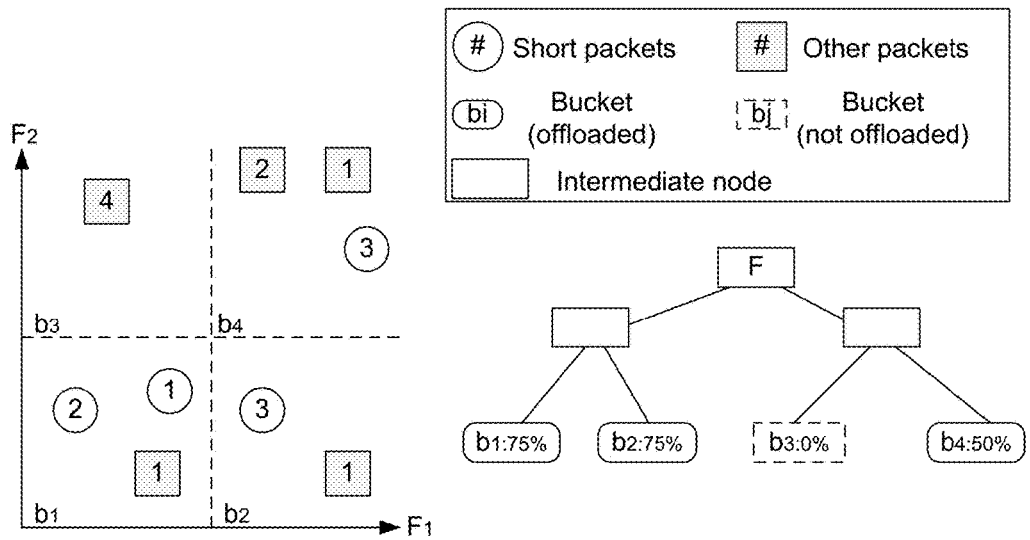
FIG. 5A illustrates exemplary decision tree sketch management for a hybrid PE approach.
Figure 5B:
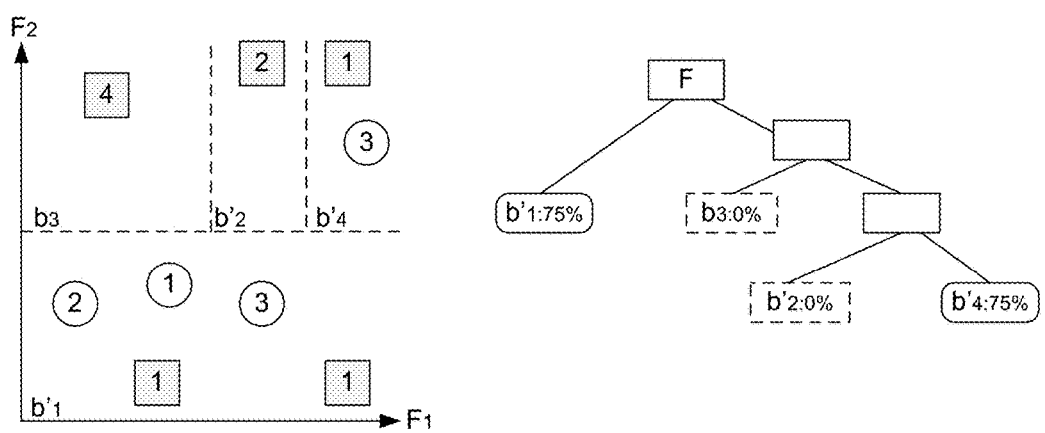
FIG. 5B illustrates exemplary decision tree sketch management for a hybrid PE approach.

FIG. 5A and FIG. 5B illustrate exemplary decision tree sketch management, which shows how the hash buckets are dynamically adjusted. Assume the packets and the mapped buckets have a two-dimensional field space. The squares and the circles depict the targeting packets and other packets, respectively. The number in the dots is the amount of packets falling in those fields during a unit period of time. As shown in FIG. 5A, initially, the field space is partitioned into four equal buckets. Assume the threshold of targeting packets to report a bucket is 3. Therefore buckets b1, b2, and b3 generate offload requests. However, since bucket b3 has only 50% purity, half of the offloaded flows are false positives. As shown in FIG. 5B, to improve accuracy, bucket b1 and b2 are merged, with zero loss of average purity. b4 is partitioned into b'2 and b'4, which increases the purity in b'4. Note that b'2 no longer generates the offload request, which improve the accuracy of short-packet flow detection. So in this example, instead of 3 buckets as shown in FIG. 5A there are now 2 buckets as shown in FIG. 5B. Fewer buckets decrease the complexity and may allow for, in this instance, reduced performance impact on vPE server 108 when determining flows to offload. For further clarification to statements herein, 50% purity means half of the flows marked as "to offload" while half marked as "not to offload." The desired case would be all the flows in a bucket to be offloaded. But if the bucket only has 50% purity, then half of the flows are offloaded while they should not be, which means false positive.

Figure 6:
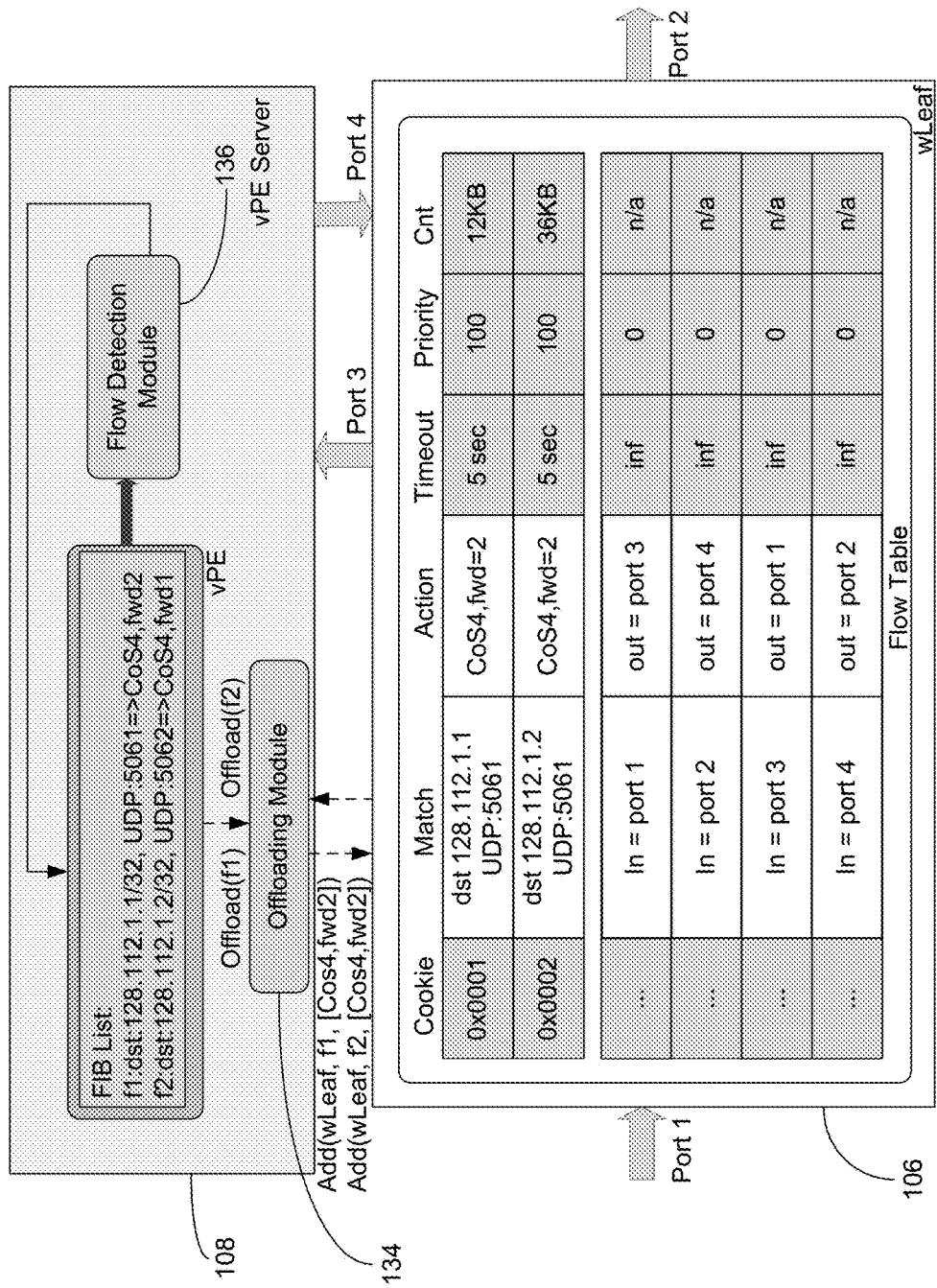
FIG. 6 illustrates an exemplary flow table management for wLeaf switch.

FIG. 6 illustrates an exemplary flow table management for wLeaf switch 106 with reference to FIG. 4. A flow table may be an abstracted table in wLeaf switch 106 that includes a prioritized list of entry to match against packets and perform actions. FIG. 6 shows the flow table status when flow f1 141 and f2 142 are offloaded to the wLeaf. The four default entries with a lowest priority defines normal data path 105, where packets from port 1 or port 2 will traverse vPE 109. These default entries remain persistently wLeaf switch 106 and therefore may have an infinite timeout. The flow entries that perform offloading for flow f1 141 and f2 142 may have a higher priority that the default entries with a consistent matching fields in the forwarding information base (FIB) list of vPE 109. Besides the soft timeout option applied here to have wLeaf switch 106 clean up the unused entry, offloading module 134 may call del function to explicitly delete an offloaded function.

It is contemplated herein that wLeaf switch 106 may have one or multiple pipelined flow tables. Each flow entry may include a number of fields, such as the following: 1) a cookie used as an unique identifier of an offloaded entry; 2) a matching field that matches against the packets to determine which entry to process the incoming packets; 3) an action fields that determines the actions to be performed on the packets matching each entry; 4) an idle timeout setting that may be applied so that an entry may be recycled if no packet matches it; or 5) a priority field that specifies the matching precedence and the counter may be polled by the offloading module for flow statistics, among other things.

It is contemplated herein that offloading module 134 may be an SDN controller that receives the offloading requests of vPE 109 which may include instructing wLeaf switch 106 to conduct offloading. Below are some details of possible functions of offloading module 134. A first exemplary function may be to adapt the data plane of wLeaf switch. Certain actions required to offload certain flows may not be feasible due to the implementation of wLeaf switch. The offloading module 134 (e.g., SDN controller) may adapt data plane capability and filter the offloading requests. Generally, whitebox switches (e.g., wLeaf switch 106) may support a programmable data plane pipeline. For wLeaf switch 106, offloading module 134 may program the data plane pipeline to match the interested fields for targeting traffic. With regard to "adapting to a data plane," PE has many features (e.g. CoS, multicast, rate limiting, traffic shaping, ACL, etc.), in which some may be implemented in existing whitebox switch, some may not. For instance, general OpenFlow switch may provide rate limiting but not traffic shaping. Therefore, hybrid PE needs to "adapt" the capability of wLeaf to see whether some features may be offloaded.

With reference to offloading module 134, a second exemplary function may be intelligent flow table management. Most whitebox switches today has a limited flow table memory. While vPEs 109 may send numerous offload requests, offloading module 134 may determine which flow entries to offload, so that most targeting flows may be offloaded with a compact table usage. As mentioned earlier, goals for this subject matter may include: 1) reducing the load of vPE server; and 2) reducing the table usage (maintain compact wleaf memory usage). The determined flows for offloading module 134 may evolve over a period because traffic patterns may change. When a certain offloaded flow no longer occurs or its data rate decreases to a threshold level, offloading module 134 may recycle (e.g., remove) the associated flow entry to make room for other candidate flows or other data traffic. Furthermore, certain flow entries may be dependent and may need to be offloaded (or removed from offloading) together to avoid incorrect flow matching. The modification of tables associated with adding or deleting flow entries may respect such dependencies. A third exemplary function with regard to offloading module 134 may include statistic collection. Offloaded traffic no longer traverses vPE 109. To track the statistics of the offloaded flows, offloading module 134 may periodically poll the packet stats (e.g., a series of counters which count byte, count packet number, etc.) of the offloaded flow entries. Such stats are useful for offloading module 134 to conduct table management (e.g., management of the offloading table) and for learning program 139 of flow detection module 136 to adjust the hash function to more accurately identify targeting flows to be offloaded.

To support the above functionalities, offloading module 134 may provide application programming interfaces (APIs) to interact with vPE 109 and wLeaf switch 106. An interface may have an offload(flow, actions) call that enables vPE 109 to send candidate flows with associated actions to offload. For the southbound interface, an adapt(tables) call may be for offloading module 134 to adapt and program the tables of wLeaf switch 106. The interfaces are logical interfaces that connect the controller with the management port of the whitebox switch. The add(wLeaf, flow, actions) call and del(wLeaf, flow) call may respectively before adding and deleting certain flow entries for wLeaf switch 106. Offloading module 134 may leverage the pull stats(wLeaf) call to pull statistics from the wLeaf switch 106.

In summary, disclosed herein is a hybrid PE approach that achieves high packet processing performance with a reduced CAPEX and OPEX through an intelligent workload division between a virtual and hardware appliance in the hybrid-PE. A hybrid-PE may include a vPE appliance and a hardware whitebox switch. The hybrid-PE has the intelligence to identify "targeting flows" that fit certain traffic pattern. The vPE delegates its packet processing operations to the whitebox switch. The vPE may work with a software-defined network (SDN) controller to program the data plane of the whitebox switches to offload the targeting flows. The offloading behaviors may be defined by policies pre-defined by a system within the PE. Flow detection module 136 may be an application running on host vPE server 108. In an example, a user may subscribe to a service that implements the hybrid PE approach.

Although the term flow is used herein, generally other data traffic may be used in the disclosed hybrid PE approach. Also, there may be determinations (e.g., based on number packets to a destination or type of traffic) with regard to data traffic is part of a packet flow. The methods herein may be distributed over multiple devices. For example, offloading module 134 and flow detection module 136 may be distributed over multiple devices. A virtual provider edge (vPE) is a virtual network function that provides the traditional provider edge functionality in the virtual environment. Basic vPE topology comprises of a single instance virtualized provider edge (vPE VNF) that provides L3VPN based connectivity between all sites of a given tenant.

Figure 7:
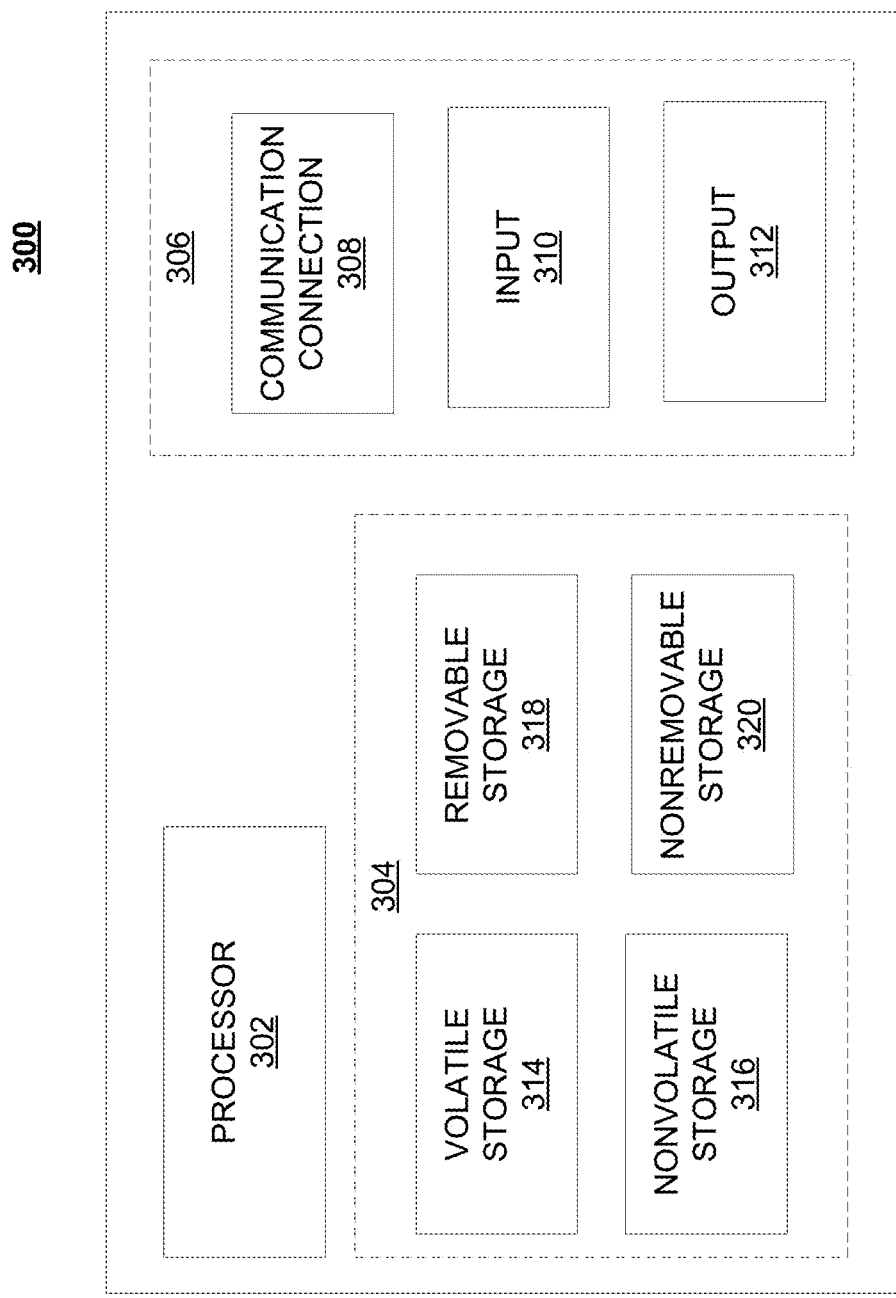
FIG. 7 illustrates a schematic of an exemplary network device.

FIG. 7 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 7 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 7) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 8:
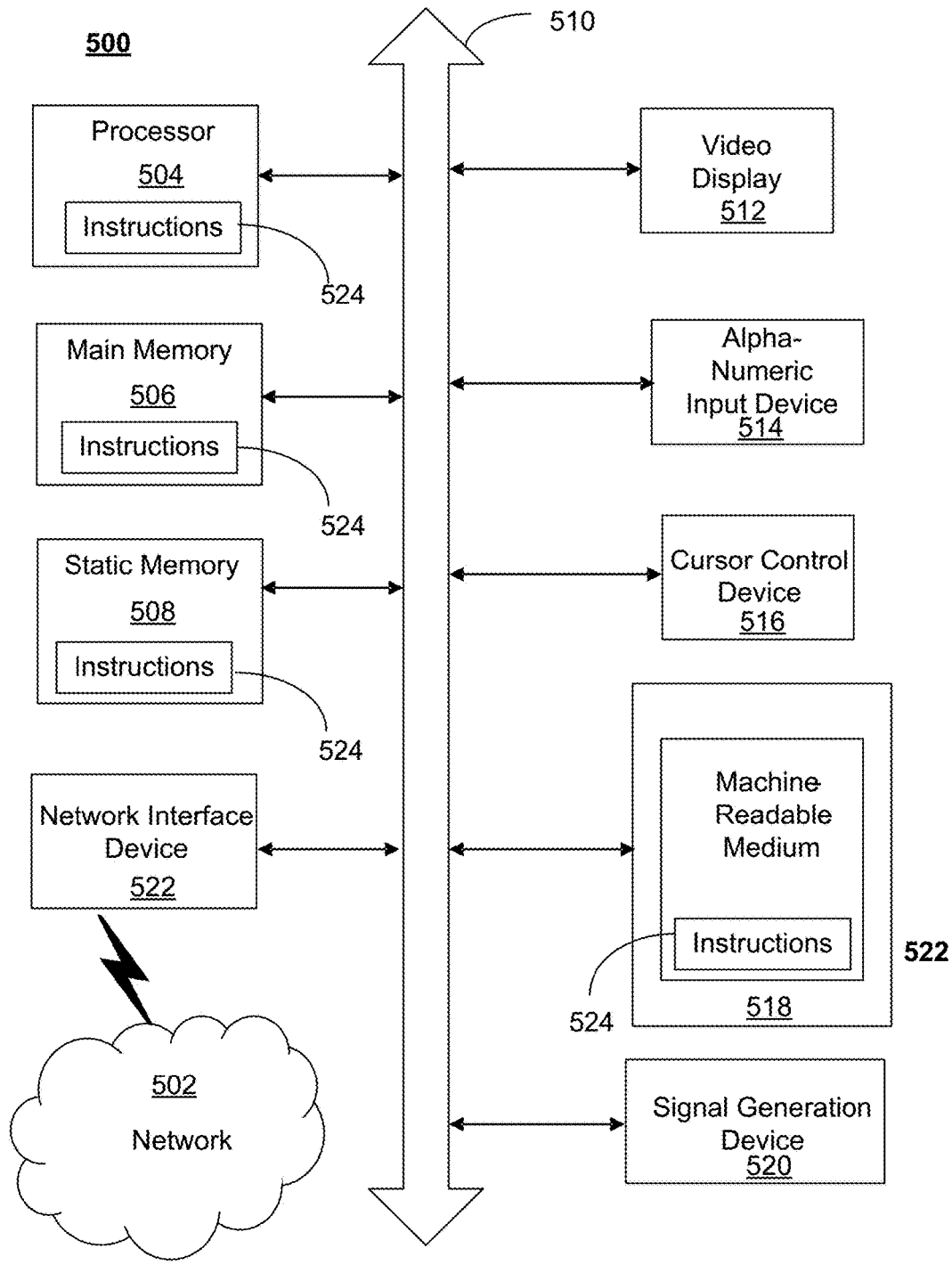
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, CE device 102, CE device 103, vPE server 108, wLeaf switch 106, and other devices of FIG. 1 and FIG. 9. Switches may be considered hardware ASIC based boxes for traffic forwarding, while servers are general CPU machines. Here, the commodity server may be considered the vPE server and the commodity whitebox switch considered the wLeaf. Customer edge (CE) device provides a customer access to the service provider network over a data link to one or more provider edge. In some scenarios, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 9A:
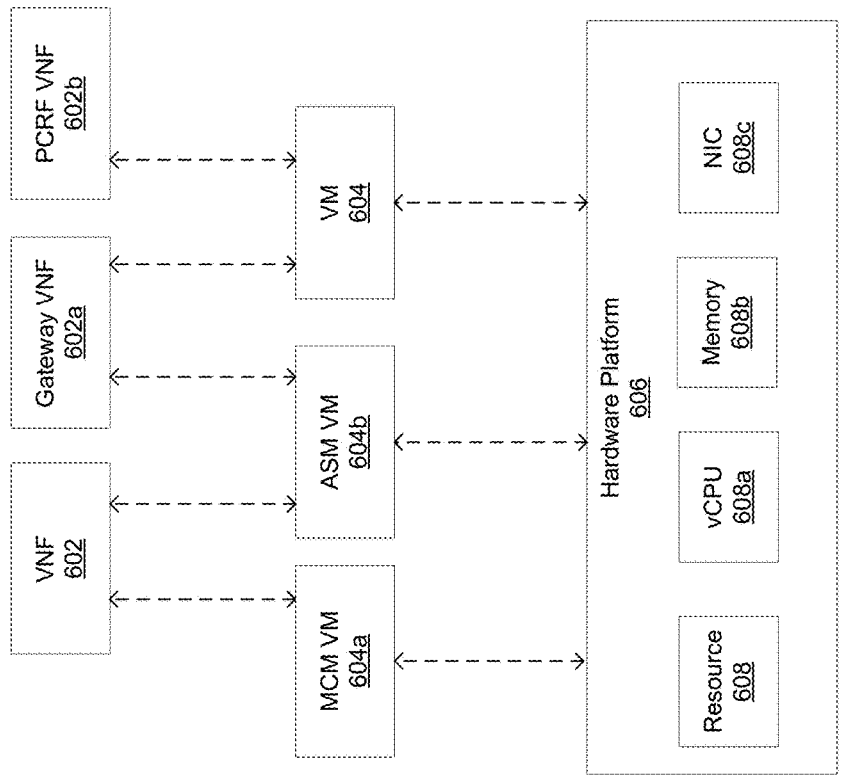
FIG. 9A is a representation of an exemplary network.

FIG. 9A is a representation of an exemplary network 600. Network 600 (e.g., system 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 9A illustrates a gateway VNF 602*a* and a policy and charging rules function (PCRF) VNF 602*b*. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 9A illustrates a management control module (MCM) VM 604*a*, an advanced services module (ASM) VM 604*b*, and a DEP VM 604*c*. Additionally or alternatively, VMs 604 may include other types of VMs. Each VM 604 may consume various network resources from a hardware platform 606, such as a resource 608, a virtual central processing unit (vCPU) 608*a*, memory 608*b*, or a network interface card (NIC) 608*c*. Additionally or alternatively, hardware platform 606 may include other types of resources 608.

Figure 9B:
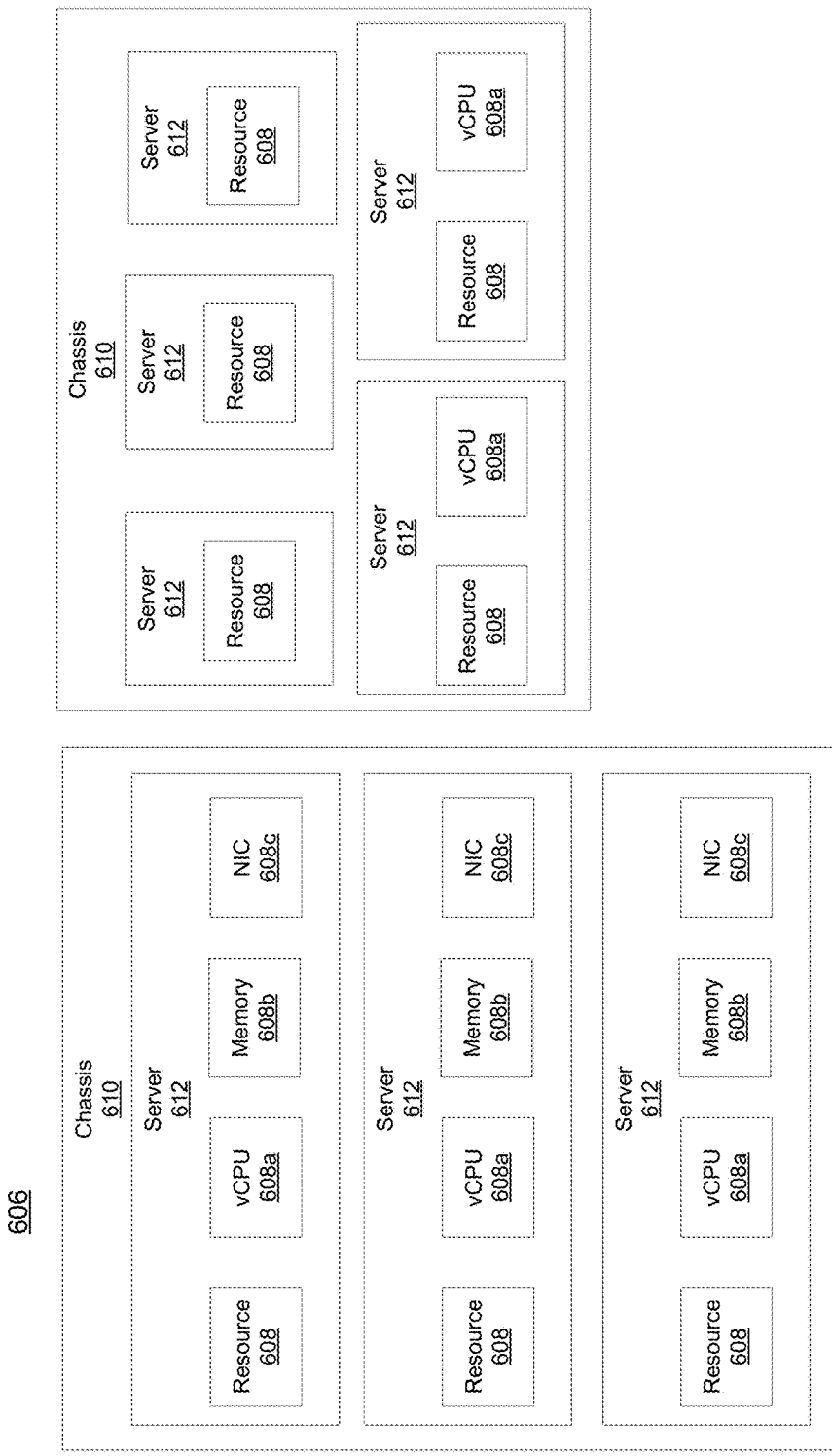
FIG. 9B is a representation of an exemplary hardware platform for a network.

While FIG. 9A illustrates resources 608 as collectively contained in hardware platform 606, the configuration of hardware platform 606 may isolate, for example, certain memory 608*c* from other memory 608*c*. FIG. 9B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 9B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608*a*, 1 GB of memory 608*b*, and 2 NICs 608*c*, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604*a*, an affinity rule may dictate that those six MCM VMs 604*a* be instantiated on the same server 612 (or chassis 610). As another example, if VNF 602 uses MCM VMs 604*a*, ASM VMs 604*b*, and a third type of VMs 604, an affinity rule may dictate that at least the MCM VMs 604*a* and the ASM VMs 604*b* be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604*a* be instantiated on a particular server 612 that does not contain any ASM VMs 604*b*. As another example, an anti-affinity rule may require that MCM VMs 604*a* for a first VNF 602 be instantiated on a different server 612 (or chassis 610) than MCM VMs 604*a* for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602*a* and PCRF VNF 602*b*. Gateway VNF 602*a* may require five VMs 604 instantiated on the same server 612, and PCRF VNF 602*b* may require two VMs 604 instantiated on the same server 612. (Assume, for this example, that no affinity or anti-affinity rules restrict whether VMs 604 for PCRF VNF 602*b* may or must be instantiated on the same or different server 612 than VMs 604 for gateway VNF 602*a*.) In this example, each of two servers 612 may have sufficient resources 608 to support 10 VMs 604. To implement sessions using these two servers 612, first server 612 may be instantiated with 10 VMs 604 to support two instantiations of gateway VNF 602*a*, and second server 612 may be instantiated with 9 VMs: five VMs 604 to support one instantiation of gateway VNF 602*a* and four VMs 604 to support two instantiations of PCRF VNF 602*b*. This may leave the remaining resources 608 that could have supported the tenth VM 604 on second server 612 unused (and unusable for an instantiation of either a gateway VNF 602*a* or a PCRF VNF 602*b*). Alternatively, first server 612 may be instantiated with 10 VMs 604 for two instantiations of gateway VNF 602*a* and second server 612 may be instantiated with 10 VMs 604 for five instantiations of PCRF VNF 602*b*, using all available resources 608 to maximize the number of VMs 604 instantiated.

Consider, further, how many sessions each gateway VNF 602*a* and each PCRF VNF 602*b* may support. This may factor into which assignment of resources 608 is more efficient. For example, consider if each gateway VNF 602*a* supports two million sessions, and if each PCRF VNF 602*b* supports three million sessions. For the first configuration—three total gateway VNFs 602*a* (which satisfy the gateway requirement for six million sessions) and two total PCRF VNFs 602*b* (which satisfy the PCRF requirement for six million sessions)—would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which a method for the hybrid PE approach may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—hybrid PE approach—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims. Although virtual provider edges and customer edge devices are disclosed, it is contemplated herein that similar functionalities of the systems disclosed herein may be with other networks (e.g., a local area network) and do not need to be in a traditional service provider network.

What is claimed:

1. An apparatus comprising:
a processor; and
a memory coupled with the processor, the memory storing executable instructions that when executed by the processor cause the processor to effectuate operations comprising:
receiving data from a switch during a period;
sampling the data during the period;
determining a plurality of characteristics associated with the sampled data;
based on a first characteristic of the plurality of characteristics reaching a threshold, determining criteria to indicate data to offload through the switch; and
based on the determining the criteria to indicate data to offload through the switch, adjusting a data path of the indicated data to bypass the apparatus for subsequent data received at the switch and matching the criteria.

2. The apparatus of claim 1, wherein the first characteristic comprises a number of times data with a first internet protocol address has been sampled during the period.

3. The apparatus of claim 1, wherein the criteria comprises an internet protocol address range.

4. The apparatus of claim 1, wherein the first characteristic comprises a number of times data with a first port number has been sampled during the period.

5. The apparatus of claim 1, wherein the criteria comprises a time duration to adjust the data path.

6. The apparatus of claim 1, the operations further comprising periodically sending a request for a statistic associated with a data flow through the switch.

7. The apparatus of claim 1, the operations further comprising periodically sending a request for a statistic, wherein the statistic comprises a rate of data with a first internet protocol address over a second period.

8. A method comprising:
receiving, by a virtual machine, data from a switch during a period;
sampling the data during the period;
determining a plurality of characteristics associated with the sampled data;
based on a first characteristic of the plurality of characteristics reaching a threshold, determining criteria to indicate data to offload through the switch; and
based on the determining the criteria to indicate data to offload through the switch, adjusting a data path of the indicated data to bypass the virtual machine for subsequent data received at the switch and matching the criteria.

9. The method of claim 8, wherein the first characteristic comprises a number of times data with a first internet protocol address has been sampled during the period.

10. The method of claim 8, wherein the criteria comprises an internet protocol address range.

11. The method of claim 8, wherein the first characteristic comprises a number of times data with a first port number has been sampled during the period.

12. The method of claim 8, wherein the criteria comprises a time duration to adjust the data path.

13. The method of claim 8, further comprising periodically sending a request for a statistic associated with a data flow through the switch.

14. The method of claim 8, further comprising periodically sending a request for a statistic, wherein the statistic comprises a rate of data with a first internet protocol address over a second period.

15. A computer readable storage medium storing computer executable instructions that when executed by a computing device cause said computing device to effectuate operations comprising:
receiving, by a virtual machine, data from a switch during a period;
sampling the data during the period;
determining a plurality of characteristics associated with the sampled data;
based on a first characteristic of the plurality of characteristics reaching a threshold, determining criteria to indicate data to offload through the switch; and
based on the determining the criteria to indicate data to offload through the switch, adjusting a data path of the indicated data to bypass the virtual machine for subsequent data received at the switch and matching the criteria.

16. The computer readable storage medium of claim 15, wherein the first characteristic comprises a number of times data with a first internet protocol address has been sampled during the period.

17. The computer readable storage medium of claim 15, wherein the criteria comprises an internet protocol address range.

18. The computer readable storage medium of claim 15, wherein the first characteristic comprises a number of times data with a first port number has been sampled during the period.

19. The computer readable storage medium of claim 15, wherein the criteria comprises a time duration to adjust the data path.

20. The computer readable storage medium of claim 15, the operations further comprising periodically sending a request for a statistic, wherein the statistic comprises a rate of data with a first internet protocol address over a second period.

* * * * *